United States Patent [19]

Konstant

[11] Patent Number: 5,316,157
[45] Date of Patent: May 31, 1994

[54] RACK HAVING BEAMS AND COLUMNS OF DIFFERING NUMBERS

[76] Inventor: Anthony N. Konstant, 920 Fisher La., Winnetka, Ill. 60093

[21] Appl. No.: 968,198

[22] Filed: Oct. 29, 1992

[51] Int. Cl.$^5$ ............................................. A47F 5/00
[52] U.S. Cl. ................................. 211/151; 211/191; 414/276
[58] Field of Search ...................... 211/151, 59.2, 162, 211/191; 414/276, 286

[56] References Cited

U.S. PATENT DOCUMENTS

| | | | |
|---|---|---|---|
| 3,337,061 | 8/1967 | Candell | 211/191 X |
| 4,613,270 | 9/1986 | Konstant et al. | |
| 4,773,546 | 9/1988 | Konstant | |
| 4,915,240 | 4/1990 | Konstant | |
| 4,949,852 | 8/1990 | Allen | 211/151 |
| 4,982,851 | 1/1991 | Konstant | |
| 5,080,241 | 1/1992 | Konstant | |
| 5,096,648 | 3/1992 | Johnson et al. | 211/151 X |

Primary Examiner—Robert W. Gibson, Jr.
Attorney, Agent, or Firm—Gerstman & Ellis, Ltd.

[57] ABSTRACT

A rack, and particularly a pallet rack which comprises at least two pairs of spaced, parallel rails. The pairs of rails typically carry at least one rolling cart for receiving a pallet. The rails are carried on at least a first beam and a second beam, the beam is being positioned and spaced in generally parallel relation to each other, and positioned transversely of the rails. A plurality of spaced, first columns are connected to and support the first beam, while a plurality of spaced second columns connect to and support the second beam. There are present a greater number of second columns than first columns, with the second columns being more closely spaced together than the first columns. By this, a greater load may be carried by the second beam, preferably without the second beam being stronger.

17 Claims, 2 Drawing Sheets

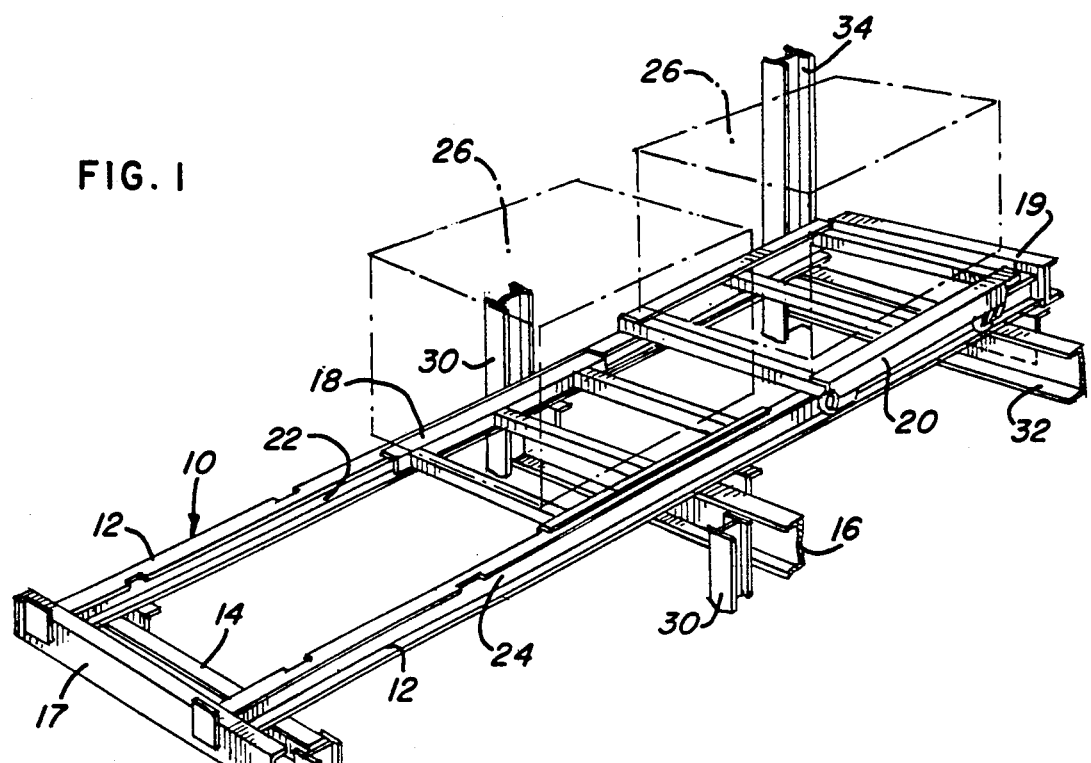
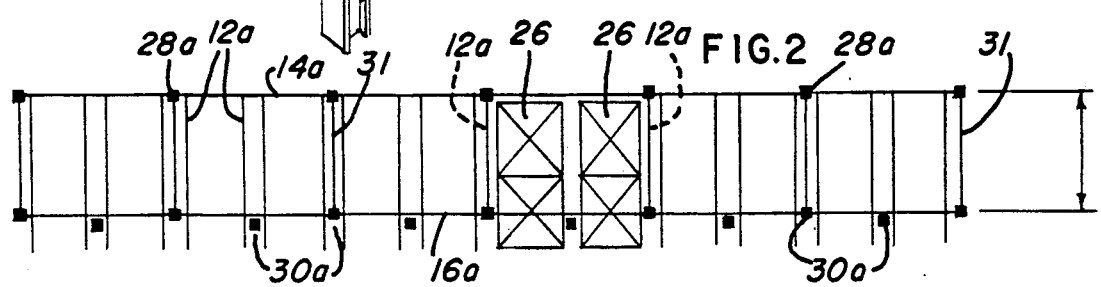
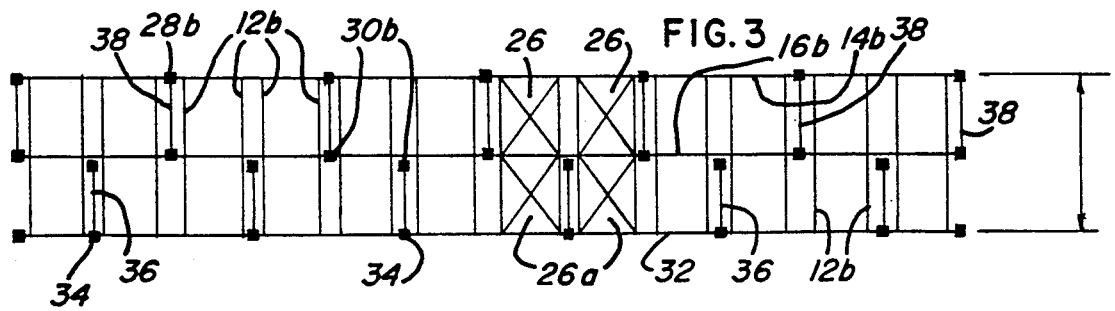
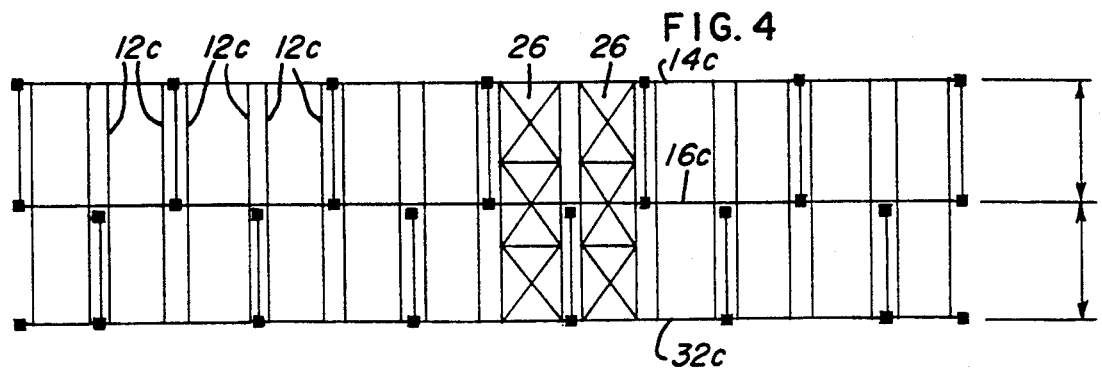

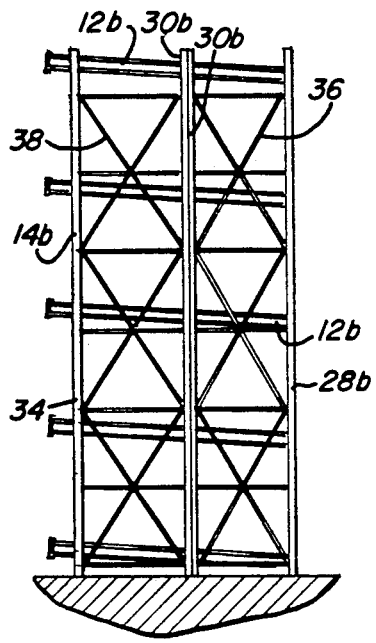
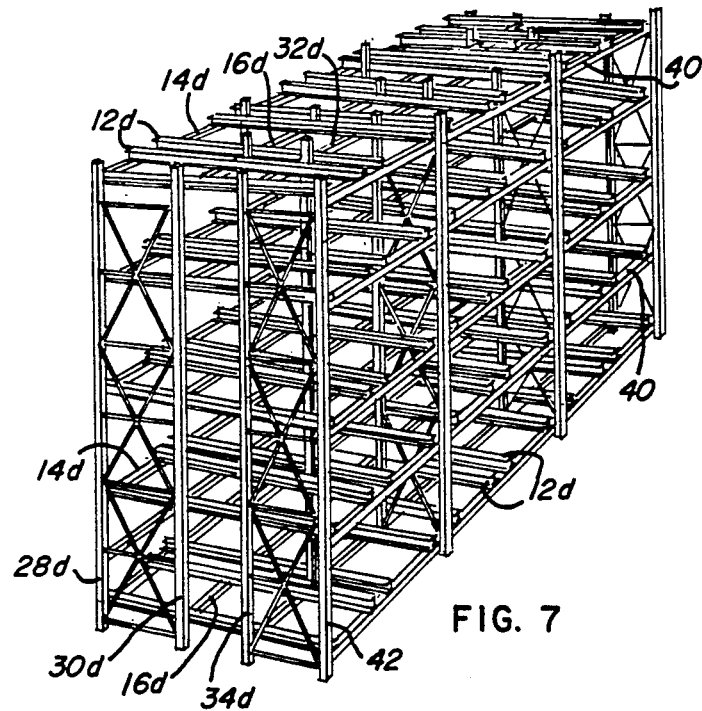
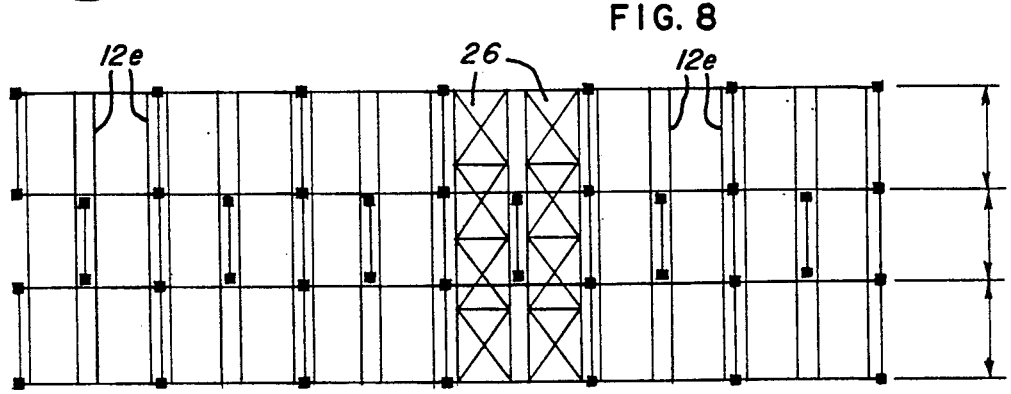
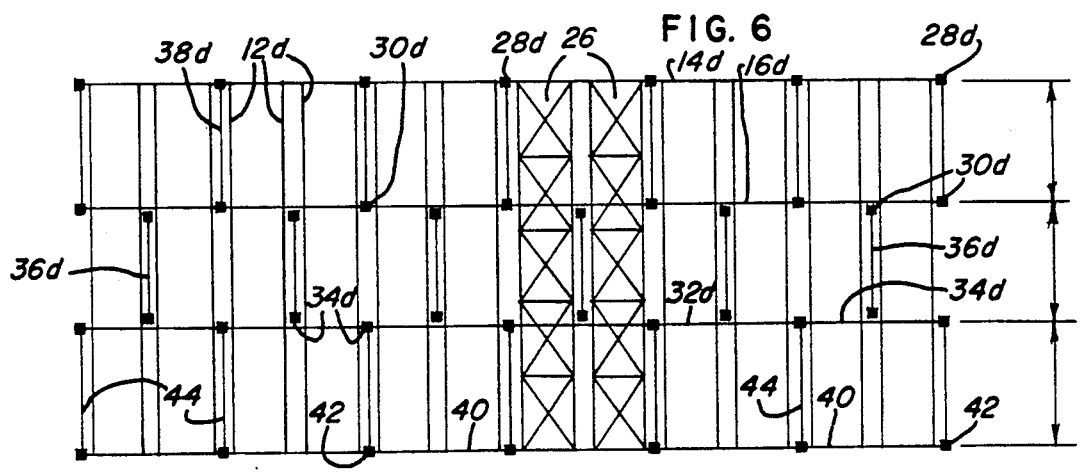

RACK HAVING BEAMS AND COLUMNS OF DIFFERING NUMBERS

BACKGROUND OF THE INVENTION

In Konstant U.S. Pat. Nos. 4,773,546; 4,915,240; 4,982,851; and 5,080,241, as well as Konstant et al. U.S. Pat. No. 4,613,270, various rack systems are disclosed in which pairs of rails are provided for receiving rolling carts. Pallets for storing goods may be placed on the rolling carts, and then pushed rearwardly along a pair of rails to make room for another pallet to be placed in front. Thus, considerable space saving is achieved.

Such racks typically have many bays containing parallel tracks for storing many pallets in side-by-side relation. Additionally, the racks may be adapted for storing typically two to five pallets in linear array along the rails in a convenient manner so that the pallets may be retrieved, one by one, from the front of the rails, with the carts rolling forwardly toward the front when they are permitted to do so. Arrays of rails may be placed one above each other, with adequate spacing so that pallets may be inserted onto carts which are in rolling relation with various pairs of the rails. Thus a rack may be provided which has a very high storage volume and storage density of pallets, for use in a warehouse, with a reduction in the number of aisles.

The various rows of rails of such racks are carried on horizontal beams, which are typically perpendicular to the rails. It has been found that the front beam typically carries less of a load than does an inner beam, which is parallel to the front beam and typically spaced inwardly along the rails about the length of one pallet or more. Because of this, it has been generally desirable to use a heavier, stronger second beam, to reduce flex of the second beam in response to the heavier load.

In accordance with this invention, a rack such as a pallet rack is provided in which inner beams which are subjected to greater loads do not have to be made of heavier, stronger material, for a simplification of the construction of the rack and for a savings in cost. Nevertheless, undue flexing of a lighter beam can be avoided in the face of heavier loads, with cost savings.

DESCRIPTION OF THE INVENTION

By this invention, a rack is provided, and particularly a pallet rack, which comprises at least two and generally substantially more, pairs of spaced, parallel rails. The pairs of rails may carry at least one rolling cart for receiving a pallet. The rails are carried on a first beam and a second beam, with the beams being positioned in spaced and generally parallel relation to each other, and positioned transversely of the rails.

A plurality of spaced, first columns are connected to and support the first beam, while a plurality of spaced, second columns connect to and support the second beam. There is present a greater number of second columns supporting the second beam than first columns supporting the first beam. The second columns are more closely spaced together than the first columns. Thus, even if the second beam is faced with heavier loads, the added number of columns provides sufficient support such that a second beam is not subject to undue flexure or load.

Preferably the first columns are spaced so that two pairs of the rails occupy the space between the first columns, the two pairs of rails thus occupying a single alcove or bay. The second columns are preferably spaced so that a single pair of rails occupies the space between the second columns. Thus it can be seen that there are preferably about twice as many columns supporting the second beam as the number of columns supporting the first beam.

It may be preferred for a third beam, carrying the pairs of rails, to be positioned in spaced and generally parallel relation to the first and second beams, with the second beam being positioned between the first and third beams. A plurality of spaced, third columns are connected to and support the third beam. The number and spacing of the third columns may be substantially similar to the number and spacing of the first columns, and substantially different from the number and spacing of the second columns.

In such a circumstance, the third columns may be in substantially shifted relation to the first columns. Also, the third columns may be respectively connected by trussing or equivalent structure to a first set of the second columns. The first columns may be respectively connected by similar trussing or equivalent structure to a second set of the second columns. The second columns of the first and second sets are in alternating relation to each other, so that the respective truss connections alternate as well.

From such a structure, a "three deep" push-back rack may be fabricated, with the substantial advantages of this invention in that the central beam does not have to be made larger and stronger than the first and third beams.

Alternatively, the third beam may be positioned as before, with the number and spacing of the third columns being substantially similar to the number and spacing of the second columns, and substantially different from the number and spacing of the first columns. In this circumstance, one may provide a fourth beam carrying the pairs of rails in spaced and generally parallel relation to the third beam on the third beam's side which is opposed to the first and second beams. A plurality of spaced, fourth columns are connected to support the fourth beam, with the number and spacing of the fourth columns being preferably similar to the number and spacing of the first columns.

In this circumstance, it may be further preferred for the first columns to be respectively connected by trussing (or equivalent structure) to a first set of the second columns, while the fourth columns are respectively connected by such trussing to a first set of the third columns. The second and third columns each also respectively define second sets of columns. The columns of the first and second sets of each of the second and third columns are, in this circumstance preferably in alternating relation to each other.

Also in this embodiment, it is preferred for adjacent second and third columns to be connected to each other by trussing or equivalent structure.

By the above, four-deep and five-deep push-back racks may be constructed with beams of the same, minimized size, without undue flexure of the central beams, and with significant cost savings.

DESCRIPTION OF THE DRAWINGS

In the drawings, FIG. 1 is a perspective view of a conventional push-back rack system, showing a pair of rails carried by three beams;

FIGS. 2, 3 and 4 are diagrammatic plan views of differing embodiments of racks making use of this invention;

FIG. 5 is a side elevational view of the rack of FIG. 3;

FIGS. 6 and 8 are diagrammatic plan views of additional embodiments of racks making use of this present invention; and FIG. 7 is an elevational view of the rack of FIG. 6.

DESCRIPTION OF SPECIFIC EMBODIMENTS

Referring to FIG. 1, a pallet rack 10 is shown, of conventional design, with which this present invention may be used. Additionally, other racks of other types may be used as well.

Pallet rack 10 comprises a pair of rails 12, which may be made of I beams, supported by a first transverse beam 14 a second transverse beam 16, and a third transverse beam 32, which beams 14, 16, 32 are spaced in generally parallel relation to each other, and connect with columns 28, 30, 34 as shown in various embodiments of this invention. Front and rear roller stop beams 17, 19 are also provided.

A plurality of rolling carts 18, 20 may be carried on rails 12. In the particular embodiment shown, cart 18 has its wheels rolling in the inner grooves 22 of rails 12, while cart 20 has its wheels rolling in the outer grooves 24 of the rails 12. Thus, as disclosed in previously cited patents, Various pallet loads 26 or the like may be placed upon the carts 18, 20, and the carts rolled rearwardly to make room for another pallet load on rack 10.

Referring to FIG. 2, a top view of a rack having multiple tracks 12 and various bays is shown. Tracks 12a are positioned upon and carried by first beam 14a and second beam 16a, both of which are perpendicular to the respective sets of tracks 12a. Loads 26 are shown to be carried on two sets of tracks 12a. Also, one cart of the type shown by either cart 18 or 20 rolls upon tracks 12a so that the rear load 26a may be carried thereon. The front load 26 may then rest upon the respective tracks 12a.

Beam 14a is carried by vertical columns 28a in a uniformly spaced manner to permit two sets of tracks 12a to be positioned between each of the respective columns 28a with room for a pallet load 26, 26a to be placed thereon.

In accordance with this invention, second beam 16a is also supported with columns 30a, with some of the columns 30a being conventionally tied to beam 16a from a position behind the beam, and some of the columns 30a being in line with beam 16a. The spacing of columns 30a is substantially one-half of the spacing between columns 28a, so that there are almost twice as many columns 30a as columns 28a, with each of columns 30a being spaced to receive one set of rails 12a between them, with enough clearance to also receive a cart with a load 26a between them.

Thus, because of the increased numbers and decreased spacing of columns 30a when compared with the number and spacing of columns 28a, second beam 16a spans less distance between columns, to account for the increased load that tends to be applied to second beam 16a when compared with first beam 14a. Thus, by this invention, second beam 16a can be made of the same or less strength as first beam 14a, with the need for increased load bearing capability being satisfied by the increased number of columns 30a. This tends to be a cheaper and a better expedient, when compared with providing the same number and spacing of columns 30a as columns 28a, plus a stronger, heavier beam 16a.

Some of columns 30a are connected by trussing 31 to columns 28a.

FIG. 3 is a view of another embodiment of a two-deep rolling rack in which, as before, beams 14b and 16b are positioned to carry pairs of rails 12b, each of which can carry a rolling cart and a pair of loads 26, 26a as in the previous embodiment. A third transverse beam 32 is provided. In this particular embodiment, more columns 30b are provided to support second beam 16b than the columns 28b of the first beam 14b, in a manner similar to the previous embodiment. However, third beam 32 is carried by an array of columns 34 in which the number and spacing of third columns 34 is substantially similar to the number and spacing of first columns 28b, and substantially different from the number and spacing of second columns 30b. Furthermore, third columns 34 are in substantially shifted relation to first columns 28b. Also, third columns 34 are respectively connected by conventional trussing 36 to a first set of the second columns 30b.

First columns 28a are respectively connected by trussing 38 to a second set of the second columns 30b, with the individual columns 30b of the first and second sets being positioned in alternating relation to each other, so that the trussing 36, 38 are positioned in alternating relation to each other along the three beams 14b, 16b, 32.

Thus the second beam 16b, which carries the largest load, is supported by a larger number of columns 30b than the number of columns 28b and 34 respectively for the first or third beams 14b, 32. Thus, even though increased loads typically are placed upon second beam 16b, undue flexing of the beam and the like is eliminated, even though the beam is not of a larger and stronger type than the first and third beams.

FIGS. 4 and 5 show a rack structure which is essentially identical in construction to that of FIG. 3 except that the respective beams 14c, 16c, 32c are spaced apart from each other to a greater degree and pairs of tracks 12c of course are appropriately lengthened, while three pallet loads 26 to fit on each set of tracks, with two of the pallet loads being carried on roller carts in a manner similar to that shown in FIG. 1.

Referring to FIG. 6, a rack of similar design to the previous embodiments is shown, having a series of pairs of rails 12d capable of holding four wheeled carts for a total of five pallets 26 in linear array, as specifically shown in U.S. Pat. No. 4,915,240. The rack of FIG. 6 comprises first and second horizontal beams 14d, 16d plus respective first and second columns 28d, 30d, connected by trussing 38d in a manner similar to the structure as shown in FIG. 3.

Third beam 32d is supported by columns 34d, and is of a design similar to that shown in FIGS. 3 and 5, with alternate columns 30d connecting by trussing 36d with alternate columns 34d. As before, beams 16d, 32d are supported by more columns, more closely spaced together, than is beam 14d for the reasons discussed above.

The embodiment of FIG. 6 also defines a fourth beam 40, to support the elongated rails 12d to permit the rows of five pallets 26 as shown. Fourth beam 40 is positioned in parallel, equally spaced relation to the other beams, and is supported by columns 42 in a pattern of spacing that corresponds to the spacing of columns 28d of first beam 14d. Columns 42 are tied to alternate members of columns 34d by trussing 44, so that alternate members of columns 34d are connected to a truss 44, and the other alternate group of columns 34d are connected to a truss 36d.

Thus, reinforced support of the inner beams of this four beam rack structure is provided.

FIG. 7 is a simplified, perspective view of the rack of FIG. 6, showing the components thereof from a different viewpoint.

FIG. 8 is a rack similar to that of FIG. 6 but of reduced dimensions, so that only four pallets 26 can be placed on each section of rail pairs 12e. Beyond that, the arrangement of beams and columns is similar to that of FIG. 6.

The above has been offered for illustrative purposes only and is not intended to limit the scope of the invention of this application, which is as defined in the claims below.

That which is claimed is:

1. A pallet rack which comprises at least two pairs of spaced, parallel rails, said pairs of rails carrying at least one rolling cart for receiving a pallet, said rails being carried on a first beam and a second beam, said beams being positioned in spaced and generally parallel relation to each other and positioned transversely of said rails, a plurality of spaced first columns connected to and supporting said first beam; a plurality of spaced, second columns connected to and supporting said second beam, there being present a greater number of second columns than first columns, said second columns being more closely spaced together than said first columns.

2. The pallet rack of claim 1 in which said first columns are spaced whereby two pairs of said rails occupy the space between said first columns, and the second columns are spaced whereby a single pair of rails occupies the space between said second columns.

3. The pallet rack of claim 1 in which a third beam carrying said pairs of rails is positioned in spaced and generally parallel relation to said first and second beams, with the second beam positioned between said first and third beams, and a plurality of spaced, third columns connected to and supporting the third beam, the number and spacing of said third columns being substantially similar to the number and spacing of said first columns and substantially different from the number and spacing of the second columns.

4. The pallet rack of claim 3 in which said third columns are in substantially shifted relation to said first columns.

5. The pallet rack of claim 4 in which said third columns are respectively connected by trussing to a first set of said second columns, and the first columns are respectively connected by trussing to a second set of said second columns, said columns of the first and second sets being in alternating relation to each other.

6. The pallet rack of claim 1 in which a third beam carrying said pairs of rails is positioned in spaced and generally parallel relation to said first and second beams, with the second beam positioned between said first and third beams, and a plurality of spaced, third columns connected to and supporting the third beam, the number and spacing of said third columns being substantially similar to the number and spacing of said second columns and substantially different from the number and spacing of the first columns; a fourth beam carrying said pairs of rails in spaced and generally parallel relation to said third beam on the third beam side opposed to said first and second beams, and a plurality of spaced, fourth columns connected to and supporting said fourth beam, the number and spacing of said fourth columns being similar to the number and spacing of said first columns.

7. The pallet rack of claim 6 in which said first columns are respectively connected by trussing to a first set of said second columns, and said fourth columns are respectively connected by trussing to a first set of said third columns, said second and third columns each respectively defining second sets of said columns, the columns of the first and second sets of each of the second and third columns being in alternating relation to each other.

8. The pallet rack of claim 7 in which adjacent second and third columns are connected to each other by trussing.

9. A rack which comprises an array of parallel, horizontal members carried on a first horizontal beam and a second horizontal beam, said beams being positioned in spaced, generally parallel relation to each other and positioned transversely of said horizontal members; a plurality of spaced, first columns connected to and supporting said first beam; a plurality of spaced, second columns connected to and supporting said second beam, there being present a greater number of second columns than first columns, said second columns being more closely spaced together than said first columns.

10. The rack of claim 9 in which a third beam is positioned in spaced and generally parallel relation to said first and second beams to hold said horizontal members, with the second beam positioned between said first and third beams, and the plurality of spaced, third columns connected to and supporting the third beam, the number and spacing of said third columns being substantially similar to the number and spacing of said first columns, and substantially different from the number and spacings of the second columns.

11. The rack of claim 9 in which a third beam is positioned and spaced in generally parallel relation to said first and second beams and supporting said horizontal members, with the second beam positioned between said first and third beams, and a plurality of spaced third columns connected to and supporting the third beam, the number and spacing of said third columns being substantially similar to the number and spacing of said second columns, and substantially different from the number and spacing of the first columns; a fourth beam carrying said pairs of rails in spaced and generally parallel relation to said third beam on the third beam side opposed to said first and second beams, and a plurality of spaced fourth columns connected to and supporting said third beam, the number and spacing of said fourth columns being similar to the number and spacing of said first columns.

12. A pallet rack which comprises at least two pairs of spaced, parallel rails, said pairs of rails carrying at least one rolling cart for receiving a pallet, said rails being carried on a first beam and a second beam, said beams being positioned in spaced and generally parallel relation to each other and positioned transversely of said rails, a plurality of spaced, first columns connected to and supporting said first beam; a plurality of spaced second columns connected to and supporting said second beam, there being present a greater number of second columns than first columns, said second columns being more closely spaced together than said first columns, said first columns being spaced whereby two pairs of said rails occupy the space between said first columns, and the second columns are spaced whereby a single pair of rails occupies the space between said second columns, and a third beam carrying said pairs of rails, positioned and spaced in generally parallel relation to said first and second beams, with the second beam positioned between said first and third beams, and a plurality of spaced third columns connected to and supporting the third beam, the number and spacing of said third columns being substantially similar to the number and spacing of said first columns, and substantially different from the number and spacing of the second columns.

13. The pallet rack of claim 12 in which said third columns are in substantially shifted relation to said first columns.

14. The pallet rack of claim 13 in which said third columns are respectively connected by trussing to a first set of the second columns, and the first columns are respectively connected by trussing to a second set of said second columns, said columns of the first and second sets being in alternating relation to each other.

15. The pallet rack of claim 12 in which a third beam carrying said pairs of rails is positioned in spaced and generally parallel relation to said first and second beams, with the second beam positioned between said first and third beams, and a plurality of spaced, third columns connected to and supporting the third beam, the number and spacing of said third columns being substantially similar to the number and spacing of said second columns, and substantially different from the number and spacing of said first columns; a fourth beam carrying said pairs of rails in spaced and generally parallel relation to said third beam on the third beam side opposed to said first and second beams, and a plurality of spaced, fourth columns connected to and supporting said fourth beam, the number and spacing of said fourth columns being similar to the number and spacing of said first columns.

16. The pallet rack of claim 15 in which said first columns are respectively connected by trussing to a first set of said second columns, and said fourth columns are respectively connected by trussing to a first set of said third columns, said second and third columns each respectively defining second sets of columns, the columns of the first and second sets of each of the second and third columns being in alternating relation to each other.

17. The pallet rack of claim 16 in which adjacent second and third columns are connected to each other by trussing.

* * * * *